Feb. 8, 1944.     A. M. LONG     2,341,278
REPAIR TOOL
Filed March 27, 1943     2 Sheets-Sheet 1
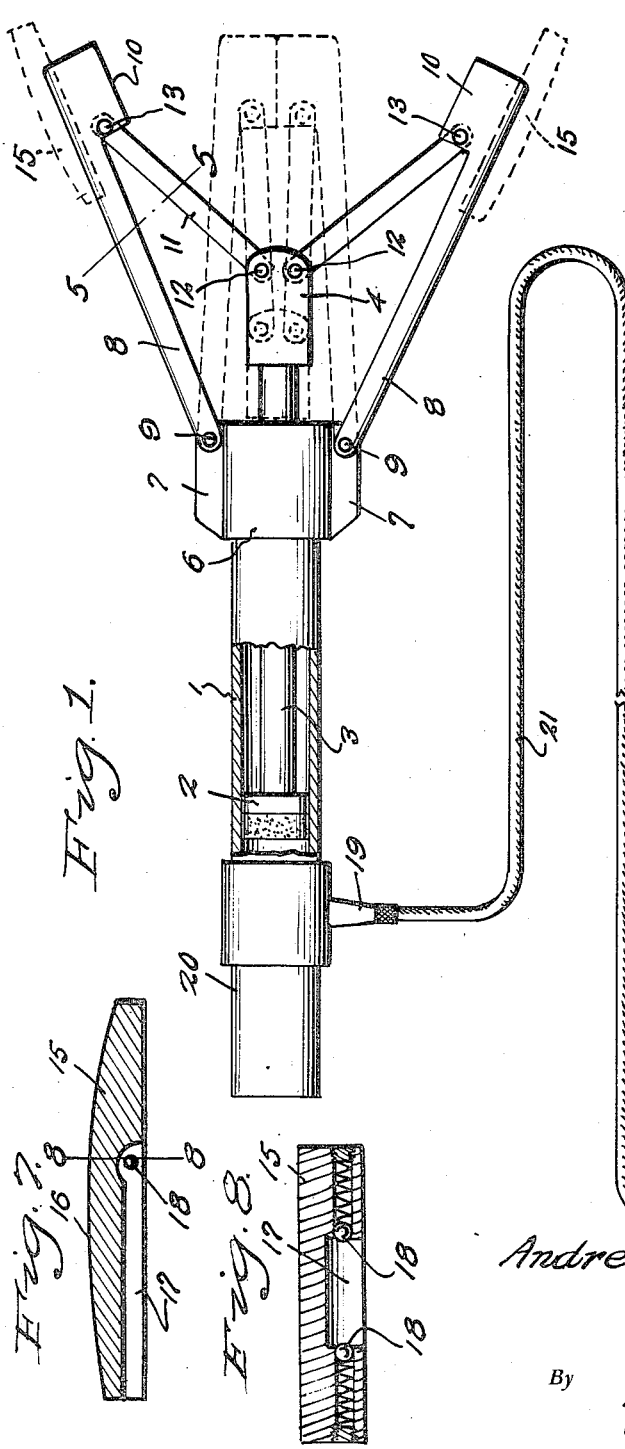
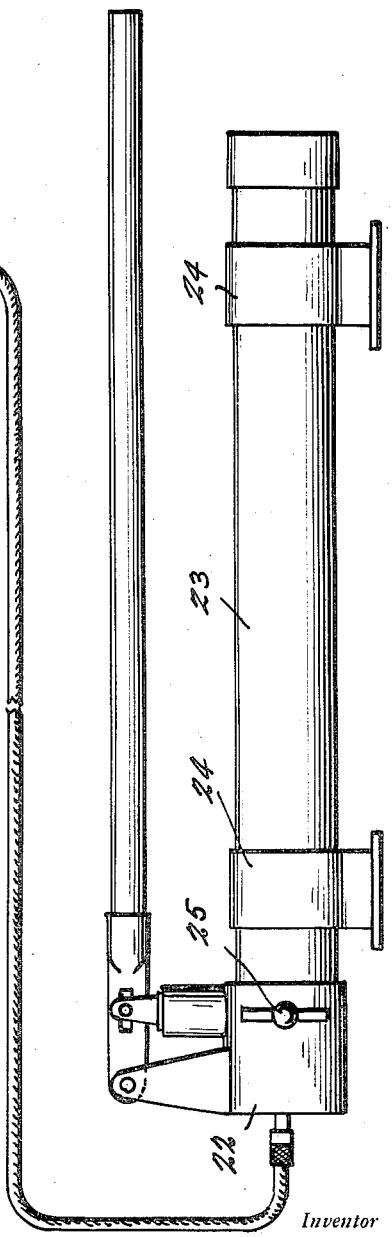
Inventor
Andrew M. Long
By Clarence A. O'Brien
and Harvey B. Jacobson
Attorneys Feb. 8, 1944.  A. M. LONG  2,341,278
REPAIR TOOL
Filed March 27, 1943    2 Sheets-Sheet 2
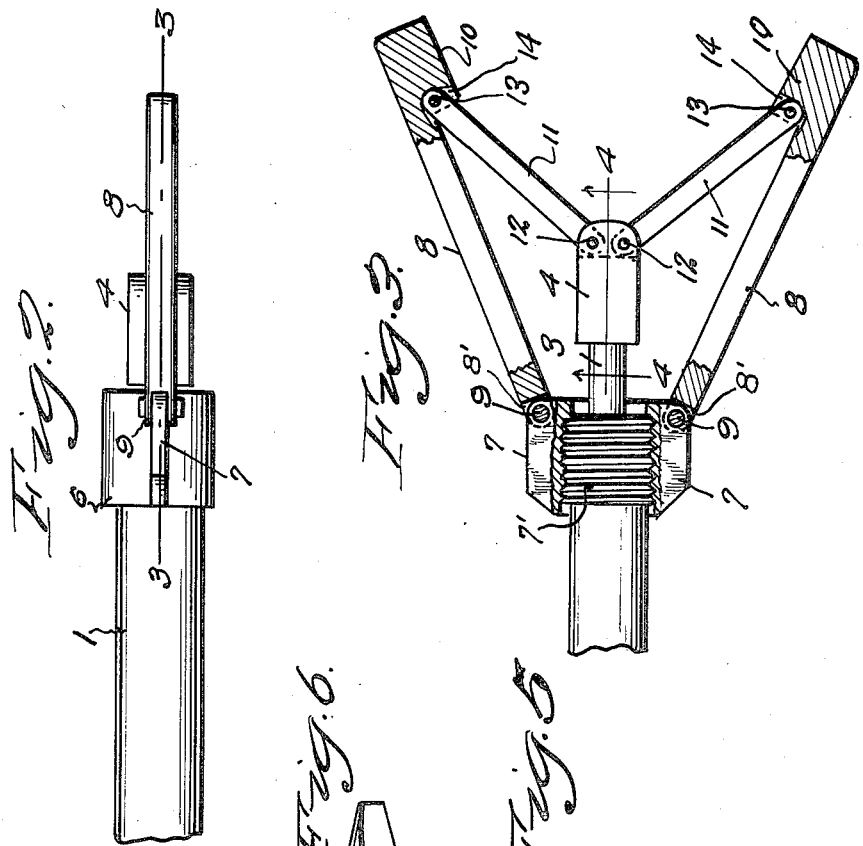
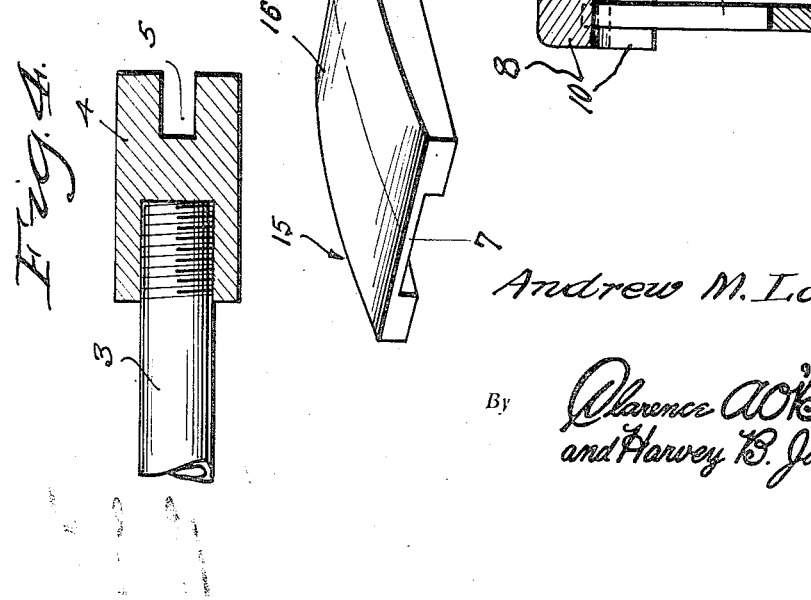
Inventor
Andrew M. Long
By Clarence A. O'Brien
and Harvey B. Jacobson
Attorneys Patented Feb. 8, 1944

2,341,278

UNITED STATES PATENT OFFICE 2,341,278

REPAIR TOOL

Andrew M. Long, Ottumwa, Iowa

Application March 27, 1943, Serial No. 480,817

1 Claim. (Cl. 153—32)

My invention relates to improvements in repair tools, the principal object in view being to provide a simply constructed, hydraulically operative tool of the spreader type for use more particularly, although not necessarily, in body and fender repair work on automobiles and to exert pressure in opposite directions in restricted spaces to facilitate straightening out dents and bends in automobile fenders and bodies.

Other and subordinate objects will presently appear when the succeeding description and claim are read with reference to the drawings accompanying and forming part of this specification.

In said drawings:

Figure 1 is a view in side elevation, partly broken away, illustrating a tool constructed in accordance with my invention, Figure 2 is a fragmentary view of the tool shank and parts carried thereby, Figure 3 is a fragmentary view in longitudinal section taken on the line 3—3 of Figure 2, Figure 4 is a fragmentary view in longitudinal section taken on the line 4—4 of Figure 3 and drawn to an enlarged scale, Figure 5 is a view in transverse section taken on the line 5—5 of Figure 1, Figure 6 is a view in perspective of one of the forming plates, Figure 7 is a view in longitudinal section taken on the line 7—7 of Figure 6, and Figure 8 is a view in transverse section taken on the line 8—8 of Figure 7.

Reference being had to the drawings by numerals, in the illustrated embodiment thereof, my improved tool comprises a shank 1 having the form of an elongated cylinder closed at both ends and formed of any light suitable metal. A suitably packed piston 2 is provided in the shank 1 for reciprocation therein and from which a suitable piston rod 3 extends and is slidably mounted in any suitable manner in what constitutes the front end of the shank 1 to extend out of the same. Extending forwardly from the front end of the piston rod 3 is an elongated head 4 having a bifurcated front end 5 and which is preferably threaded onto the piston rod 3, as shown in Figure 4. The front end of the shank 1 carries a short sleeve 6 threaded thereon, as at 7', and comprising a pair of diametrically opposite, longitudinally extending flanges 7 arranged in a common plane with the head 4.

A pair of elongated spreader arms 8 extend forwardly from the sleeve 6 with rear bifurcated ends 8' straddling the front ends of the flanges 7 and pivoted to said flanges, as by pins 9, the arrangement being such that said arms are swingable toward and from each other, respectively. The front or forward ends of the arms 8 are provided with flat-faced enlargements 10 extending laterally from the inner sides of said arms and designed to abut when said arms are swung inwardly to establish a limit of movement of said arms in that direction. It will be noted that, as shown in Figure 1 in dotted lines, in the limit of inward swinging movement of said arms 8, the arms converge forwardly of the shank 1 and are disposed close together so that they may be readily inserted in restricted spaces.

The head 4 is operatively connected to the arms 8 by means of a pair of flat links 11 having rear ends pivoted, as at 12, in the bifurcated end 5 of said head so that said links may swing toward and from each other in a common plane with the arms 8. The front ends of the links 11 are suitably pivoted, as at 13, in rear end notches 14 formed in the enlargement 10, the arrangement being such that when the arms are swung into their limit of movement toward each other, said links will diverge from the head 4, relatively, out of dead center relation with respect to the line of thrust of the head 4, whereby under forward thrust of the head 4 said links will tend to move the arms 8 away from each other.

A pair of former plates, or shoes, 15 such as that shown in Figure 6, are provided for attachment to the front ends of the arms 8 on the outer sides of said arms. The plates 15, as shown, are provided with outer convex faces 16 for fitting in rounded parts to shape the same. However, said plates may be otherwise shaped for straightening different surfaces. For attachment to the arms 8, said plates 15 are preferably provided with rear central, longitudinal grooves 17 adapting the same to be slid over the outer or front ends of the arms 8, and with a pair of spring-pressed, friction-gripping balls 18 at opposite sides of the grooves 17 for coaction with the sides of the arms 8 to frictionally lock said plates to said arms.

The piston 2 is designed to be operated forwardly by fluid under pressure and to this end a suitable fluid inlet nipple 19 extends laterally from the shank 1 in the rear of said piston 2. In the illustrated arrangement, said nipple 19 extends from a rear cap section 20 which may be detachably attached in any suitable manner to the rest of the shank 1 to form a part thereof.

A flexible fluid pressure line 21 is extended from the nipple 19 for attachment to a source of fluid under pressure.

As shown, the line 21 may be attached to a lever-operated, plunger-type fluid pump 22 on one end of a fluid supply cylinder 23 equipped for support by standards 24, the pump being provided with a control lever 25 for permitting fluid to return from the line 21 back into the pump 22 and cylinder 23. The details of the pump 22 and parts related thereto form, per se, no part of the present invention and therefore need not be further entered into herein.

The operation of the described invention will be readily understood. Fluid under pressure being introduced into the shank 1 behind the piston 2, by operation of the described pump 22, the piston 2 is driven forwardly in the shank 1 to correspondingly move the piston rod 3 and head 4 and thereby, through the links 11, separate or spread the arms 8 against the work to reshape the work either by pressure against the same or by use of the plates 15 as anvils for reshaping of the work against the same by percussion. As soon as pressure is relieved in the shank 1, under control of the lever 25, the tool may be withdrawn from the work and the arms forced together manually, thereby, through the links 11, returning the head 4, piston rod 3 and piston 2 to starting position determined by swinging of the arms 8 into their described limit of movement toward each other.

The foregoing will, it is believed, suffice to impart a clear understanding of my invention without further explanation.

Manifestly, the invention, as described, is susceptible of modification without departing from the inventive concept, and right is herein reserved to such modifications as fall within the scope of the appended claim.

What I claim is:

In a tool for use in straightening fenders, and the like, an elongated cylindrical shank closed at both ends, a piston having a working fit in said shank, a piston rod having one end extending out of one end of the shank, a pair of straight spreader arms having rear ends pivoted to said end of the shank for swinging movement of the arms in a common plane toward and from each other, respectively, said arms having flat-faced enlargements on the front ends thereof forming a pair of opposed abutments limiting movement of said arms toward each other, a pair of arm operating links having rear ends pivoted to said end of said rod and front ends pivoted in said enlargements, and a pair of forming shoes detachably connected to the outer ends of said arms opposite said enlargements, and means to introduce hydraulic pressure into one end of said shank.

ANDREW M. LONG.